C. R. SCHMIDT.
PIPE COUPLING.
APPLICATION FILED OCT. 5, 1907.
924,840.
Patented June 15, 1909.
2 SHEETS—SHEET 1.
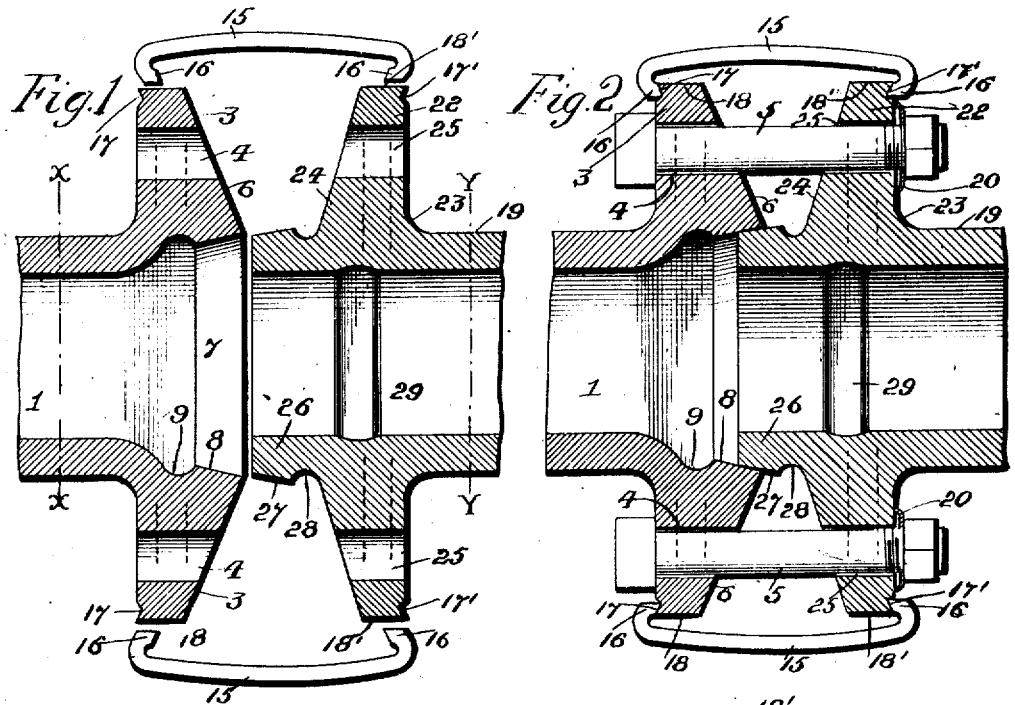
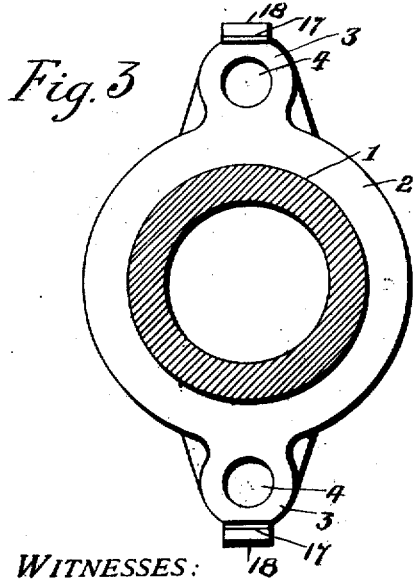
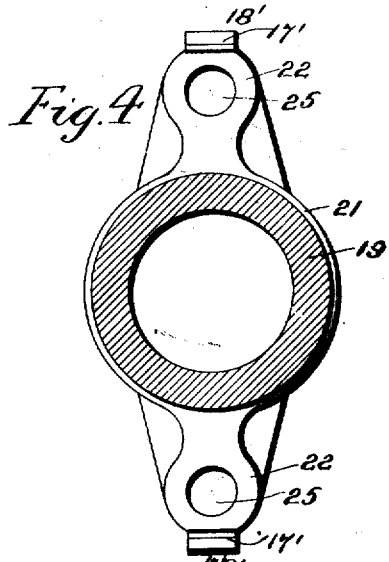
WITNESSES:
INVENTOR
Charles R. Schmidt
by Connolly Bros
Attorneys

C. R. SCHMIDT.
PIPE COUPLING.
APPLICATION FILED OCT. 5, 1907.

924,840.

Patented June 15, 1909.
2 SHEETS—SHEET 2.

WITNESSES.

Charles R. Schmidt
INVENTOR
by Connolly Bros
Attorneys

UNITED STATES PATENT OFFICE.

CHARLES R. SCHMIDT, OF BALTIMORE, MARYLAND.

PIPE-COUPLING.

No. 924,840.   Specification of Letters Patent.   Patented June 15, 1909.

Application filed October 5, 1907. Serial No. 396,122.

*To all whom it may concern:*

Be it known that I, CHARLES R. SCHMIDT, a citizen of the United States, residing at Baltimore, State of Maryland, have invented certain new and useful Improvements in Pipe-Couplings, of which the following is a specification.

This invention has relation to pipe couplings and relates particularly to couplings for cast iron pipes wherein the interfitting faucet and spigot ends are tapered and machined or ground to produce a tight joint.

My invention has for its object the provision of novel means for producing a perfectly tight joint in couplings of the above mentioned character and in order to accomplish the desired result I so construct the faucet end of each pipe section as to render the same elastic so that it will yield under the strain imposed upon it by the spigot end or entering member of the adjacent pipe section and accommodate itself to inequality or unexactness in shape of the spigot end, due to imperfect workmanship and will also permit of adjacent sections of pipe being perfectly joined even though they are laid somewhat out of exact alinement. I produce the required elasticity of the faucet section by enlarging the bore of the faucet section adjacent to the tapered portion so as to diminish the thickness of the wall of the faucet member and render the same expansible and elastic to a sufficient degree to accomplish the desired result.

A further object of my invention is to provide means for clearing the tool with which the machining or finishing of the tapered portion of the spigot member is performed and for obviating breakage at the point where the tapered surface of the faucet end meets the flange of the coupling and these last named objects I accomplish by providing a concave groove back of the tapered portion of the spigot end and adjacent the flange.

Figure 5:
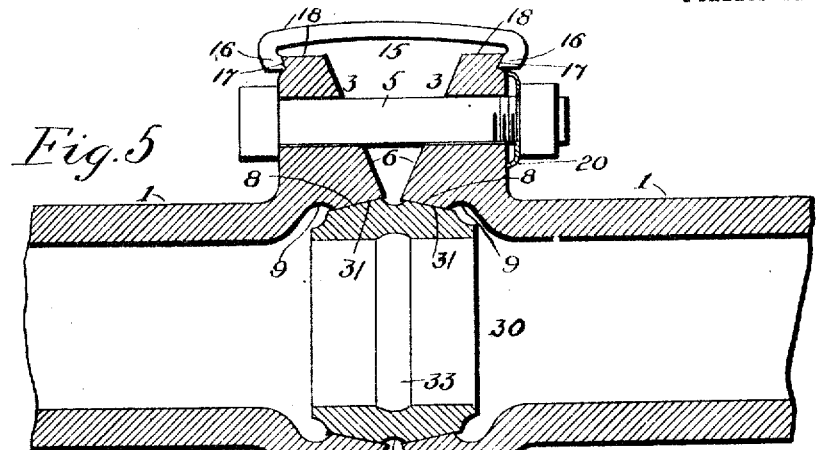
Figure 6:
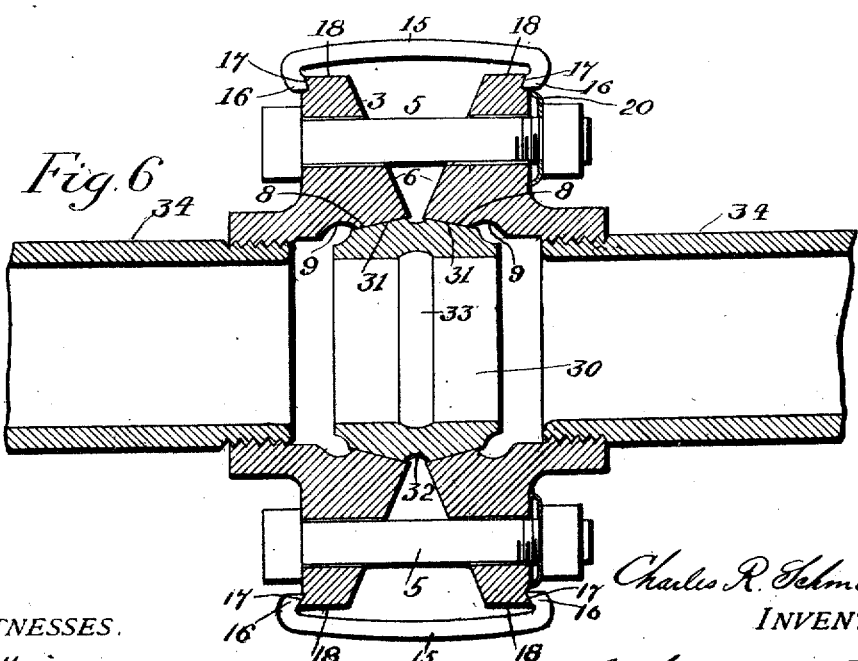

I have illustrated my invention in the accompanying drawing in which:

Figure 1 is a vertical longitudinal sectional view of a pipe section constructed according to my invention, the parts being separated. Fig. 2 is a similar view of the same, the parts being connected together. Fig. 3 is a transverse sectional view on the line X—X of Fig. 1. Fig. 4 is a similar view on the line Y—Y of Fig. 1. Fig. 5 is a vertical longitudinal sectional view of a modified form of my invention. Fig. 6 is a similar view of another modified form of the same.

Referring first to Figs. 1, 2, 3 and 4 in which 1 designates the body of the pipe section which carries the faucet or receiving member of the coupling and which is provided with the integral flange 2, carrying lugs 3, having holes 4 for the reception of bolts 5, by means of which adjacent sections of pipe are coupled together.

The flange 2 joins the body 1 by a curved line forming a concave corner which minimizes the danger of breakage at this point. The faces of the flange 2 and of the lugs 3 are beveled as shown at 6, this beveled surface extending from the outer edges of the lugs and flange to within a short distance of the bore or cavity 7 in the center of the flange, which bore or cavity constitutes the faucet or receiving portion of the coupling.

The bore or cavity 7 is formed with an inwardly tapered surface 8 extending from the face of the flange toward the center of the same and beginning at the inner edge of the tapered surface 8, the bore or cavity 7 is gradually enlarged and then diminished to the size of the bore of the pipe on the reverse curved line 9, thereby forming an annular recess adjacent the tapered surface 8. This enlargement of the bore or cavity of the faucet section in the rear of the tapered portion provides the required elasticity for the accomplishment of the first object hereinbefore set forth and constitutes the most important feature of my invention and the manner in which the elasticity so provided is utilized in the provision of a perfectly tight joint will be hereinafter described. In addition to the securing bolts 5 I provide metallic clamps 15 which engage by means of their inturned ends 16 with notches 17 formed in the outer surfaces of lugs 18 that are formed integral with the lugs 3, and with corresponding lugs 18' having notches 17' carried by the entering or spigot member of the coupling.

The spigot or entering member of the coupling is shown at the right in Figs. 1 and 2 of the drawing, and 19 designates the body of the pipe section and 21 a reinforcement thereof. The reinforcement 21 carries lugs 22 and the rear surfaces of the lugs and the flange join the body of the pipe on a curved line and the faces of the reinforcement and the lugs are beveled as shown at 24 and the lugs are provided with holes 25 registering with the holes 4 in the lugs 3. The spigot end of the pipe section 19 is designated 26 and is provided as shown with an outer tapering surface 27 which is preferably formed at a slightly more acute angle to the longitudinal axis of the pipe than the tapered surface 8 of the faucet section, and in the rear of the tapered surface 27 I form a concave groove 28 which merges gradually into the beveled faces of the reinforcement 21 and the lugs 22.

The groove 28 renders the spigot end 26 elastic and also provides clearance for the tool used to machine or finish the beveled surface of the spigot end and also minimizes danger of breakage which would be liable to take place at the junction of the spigot end with the flange if the point of juncture was a sharp corner or angle. In order to give additional elasticity to the spigot or entering member of the coupling I form a concave annular groove 29 in the wall of the bore of this section, said groove being preferably located somewhat farther from the edge of the spigot end than the groove 18.

The parts as described are preferably made of cast iron and when the adjacent ends of pipe sections are to be joined, the spigot end of one section is inserted in the faucet end of an adjacent section and bolts 5, are passed through the holes in the lugs of both sections and when the bolts are tightened up by screwing up the nuts with which they are provided, the two sections are drawn tightly together and form a perfectly tight and water or gas proof joint. If desired the clamps 15 are also applied as shown in Fig. 2 and serve to hold the members tightly together in the event of the bolts failing to do so. In drawing the sections together the faucet section yields or expands slightly owing to its elasticity so that when the coupling operation is completed the spigot end will be tightly and snugly fitted in the faucet end, notwithstanding any slight irregularity that may exist in either section and notwithstanding any slight deviation in axial alinement of the two sections that may occur.

In Fig. 5 of the drawing I have shown a modified form of my present invention in which both members of the coupling are faucet or receiving members and in which I employ a double cone shaped nipple or thimble to effect a tight joint. In the form shown in Fig. 5 both members of the coupling are precisely the same as the faucet or receiving member of the coupling shown in the several figures hereinbefore described and in order to produce a tight joint between these members I provide a nipple or thimble 30 which is of double-cone shape, having its external surface tapering inwardly from or near the center toward both ends as shown at 31, 31. In order to render the thimble 30 elastic, I form the thimble with an external groove 32 and an internal groove 33.

In Fig. 6 of the drawing I have shown another modified form of my invention in which both members of the coupling are faucet or receiving members and in which the double-cone shaped thimble 30 is employed to effect a tight joint between these two members, but this form of my invention is designed to render the improvement applicable to wrought iron pipes and I have in this figure shown the coupling members, which in the other figures are shown as formed integral with the pipe members, as separate parts formed with screw threaded bores for the reception of the screw threaded ends of wrought iron or steel pipes 32.

I have shown the bolts 5 as provided with spring washers 20, to provide the required degree of flexibility in the joint, as it has been found that where such elasticity is provided the joint will permit of the usual longitudinal expansion and contraction of the pipe sections without detriment to the integrity of the joint, the spigot end in one form or the thimble in the other form of the device slipping in and out of the tapered faucet section to the required degree and the elasticity of the faucet section serving to always preserve a tight joint during and after such movement.

I claim:

1. In a coupling for pipes, a coupling section having a tapered spigot end, in combination with a faucet section having a tapered faucet opening to receive said spigot end, the sections being provided with means for drawing them together and the bore of the faucet section being enlarged adjacent the inner end of the tapered portion thereof and being sufficiently elastic at said enlargement to expand when the sections are drawn tightly together.

2. In a coupling for pipes the combination of a faucet section having a tapered opening with a spigot section having a tapered spigot end and a groove at the rear of the tapered portion of the spigot end on the outside of the same and a groove on the inner wall of the spigot section.

3. In a coupling for pipes, the combination of an exterior tapered spigot section with an interiorly tapered faucet section and means for drawing said sections together the bore of the faucet section being enlarged at the rear of the tapered portion and being elastic at such enlargement, the inner walls of the enlarged portion being formed on curved lines.

4. In a coupling for pipes the combination with faucet members of an elastic coupling thimble having a groove in its inner wall, said thimble being adapted to enter the faucet members.

In testimony whereof I have affixed my signature, in presence of two witnesses.

CHARLES R. SCHMIDT.

Witnesses:
CLYDE B. WEIKERT,
THOS. A. CONNOLLY.